June 8, 1943.     D. S. WEISS     2,321,535
COUPLING EYE
Filed Oct. 10, 1941
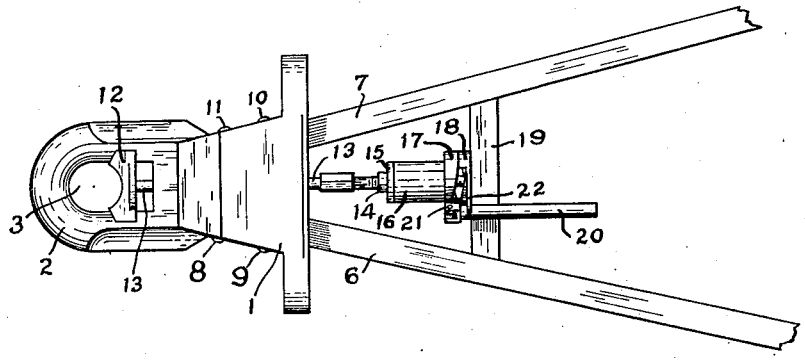
Fig. 1.
Fig. 2.
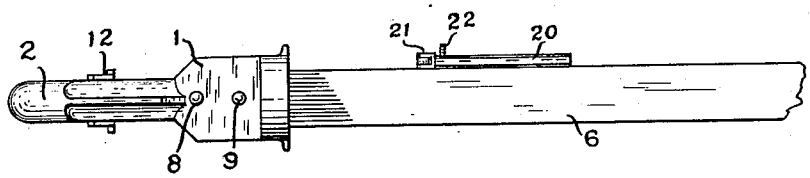
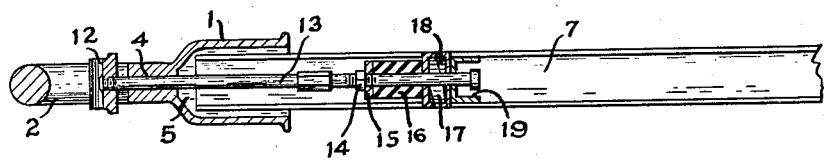
Fig. 3.
Inventor:
Dewey S. Weiss,
By Rudolph B. Prentice
Attorney.

Patented June 8, 1943

2,321,535

UNITED STATES PATENT OFFICE 2,321,535

COUPLING EYE

Dewey S. Weiss, Portland, Oreg.

Application October 10, 1941, Serial No. 414,462

3 Claims. (Cl. 280—33.15)

This invention relates to coupling eyes of the general type used in connection with a coupling hook to couple tractor and trailer vehicles.

The principal object of this invention is the provision of means to effectively restrain coupled vehicles from motion relative to each other.

A second object is the provision of means to distribute stresses and prevent the alternate straining of the involved structure due to hauling and backing operations.

Other objects and advantages of this invention will be apparent in the following discourse wherein the significance of the reference characters in the accompanying drawing, details of construction of a typical coupling eye embodying the invention, and the particular advantages thereof, are explained.

Referring to the drawing:

Figure 1 represents a view of the top of the coupling eye as the same appears when secured to the draft-member, or tongue of a trailer.

Figure 2 represents a view of the side of the assembly as shown in Figure 1.

Figure 3 represents a view of a vertical longitudinal section of the same assembly.

Referring now more particularly to the drawing:

An integral steel casting 1 is formed in detail with a forwardly extending loop 2 defining an aperture or eye 3 of semi-circular figure at the forward end and rectangular figure at the rearward end thereof. Communicating with this aperture 3 at its rearward extremity is a bore 4 of circular cross-section opening to the rear into a recess 5 of such figure and dimensions as will accommodate the forward extremities of the tongue-arms 6 and 7.

These tongue-arms 6 and 7 are conveniently riveted to the eye-casting 1 as by means of the rivets 8, 9, 10, and 11.

A throat-piece 12 is guided by and slidable upon the internal sides of the loop 2 to regulate the size of the eye 3. This throat-piece 12 is rigidly secured to the forward end of a rod 13, slidable longitudinally in the bore 4 and extending rearwardly to a threaded engagement with the nut 14, thence slidably through the washer 15, rubber cushion 16, cam-members 17 and 18 and finally through the transverse beam 19 of the trailer tongue.

The cam-member 18 is stationary and firmly secured to the beam 19. The other and complementary cam-member 17 is rotatable about the rod 13 and coacts with the cam-member 18 to compress the rubber cushion 16 and thus urge the throat-piece 12 forwardly to constrict the eye 3.

A handle 20 is pivotally attached at 21 to the rotatable cam-member 19 and in the adjustment at which it is shown in Figure 1 serves additionally as a latch engaging with an extension, or striker 22 integral with the stationary cam-member 18, to lock the rotatable cam-member 17 against accidental rotation.

The operation of the device is as follows:

When a tractor vehicle with trailer attached are traveling along a perfectly smooth stretch of highway there is no motion of the two vehicles relative to each other. If uneven roadway is encountered it will be apparent that the two vehicles will tend to move at varying velocities and thus set up more or less violent and alternating stresses in the line of motion of the vehicles.

This phenomenon is the product of the variant lengths of roadway passed over by the two vehicles in the same interval of time as measured along the road surface contacted by the wheels of both vehicles and the loaded weights of both vehicles resulting in the imposition of such forces upon the coupling as are necessary to accelerate or retard either one or both the vehicles.

This phenomenon is in obvious evidence when a tractor and trailer train passes rapidly along a city street the surface of which is raised to form cross-walks at each intersection. As the tractor vehicle mounts the incline it is retarded and the stress communicated to the trailer through the coupling. As the trailer mounts the same incline it will be retarded and the tractor vehicle probably accelerated at the same moment.

These stresses are not alone due to gravity but the effects thereof are augmented by the momenta of the vehicles themselves which tend to maintain uniform linear velocities despite the fact that the directions of movement may suddenly change from uphill to down-hill and the velocity of one vehicle with respect to the line or direction of motion of the other, may suddenly change value in accordance with the degree of mutual inclination of the road surfaces from the truly parallel relationship.

Thus it will be evident, that the forces imposed upon the coupling will depend upon the character of the roads and the weights and speed of the coupled vehicles, and further that these forces alternate in direction as well as magnitude. Hence, to effectively prevent motion between the coupling members, the coupling must be made up with sufficient force to impose strains in the coupling equal to or greater than those possible of development in the evolutions just described.

This invention provides the means to make up a coupling with whatever force, experience and usage indicates is desirable.

The nut 14 is screwed down to compress the rubber cushion 16 in such measure as is found best to produce a force urging the throat-piece 12 against the coupling hook of the conventional type, not shown.

Once the proper adjustment is discovered, the nut 14 is not disturbed. To uncouple the vehicles, the handle 20 is released from the striker 22, swung out to its position of greatest leverage at right angles to the rod 13, and moved to contract the cam assembly 17 and 18, thus allowing the rubber cushion to expand and hence, release the throat-piece 12 from forcible engagement with the tractor hook. Upon the next coupling, the handle 20 is merely swung to its locked position as shown in Figure 1 and the throat-piece 12 will be urged forward with the same force as before determined.

It will be recognized that this strain is advantageously imposed in a direction identical to that of the line of draft so as not to aggravate the strains upon the tractor hook beyond that degree for which the same was designed, namely to safely draw the load. In this device the coupling force and the reaction thereof are both transmitted to the closed structure of the eye and attached parts and the coupling pressure confined to the compressive stressing of the hook section, adding no load whatever to the tractor hook beyond that for which it was designed.

From these effects the weight carrying capacity of truck and trailer equipment is greatly increased without necessitating the replacement of tractor coupling-members and trailer-eyes to fit.

I claim:

1. A coupling eye comprising, a closed loop attachable to a trailer tongue, a throat-piece slidable within said loop, a reciprocable rod of adjustable length secured to said throat-piece and extending rearwardly of said loop, a resilient element engaging the remaining end of said rod, cam means reacting against the trailer tongue to urge said resilient element, said rod and said throat-piece, in the direction of draft, and pivotal handle means attached to said cam means to operate and lock the latter.

2. A coupling eye comprising, a closed loop attachable to a trailer tongue, a throat-piece slidable within said loop to regulate the size of the aperture thereof, a rod extending rearwardly from said throat-piece, a resilient element engaging the remaining end of said rod, mechanical means reciprocable through a limited distance serving to compress said resilient element and thus actuate said rod and throat-piece, and lock means serving to secure said mechanical means against accidental release.

3. In a coupling eye having a slidable throat-piece therein, means to provide for the engagement of the throat-piece with a coupling hook with a predetermined force comprising, a rod attached at one end to the throat-piece and fitted at the opposite end with screw extension means, a resilient element engaging said screw extension means, and manually operable cam means to urge the system in compression with a predetermined force.

DEWEY S. WEISS.